July 13, 1943.    G. J. HUGHES    2,323,997
CONTROL SYSTEM
Filed April 19, 1941    2 Sheets-Sheet 1
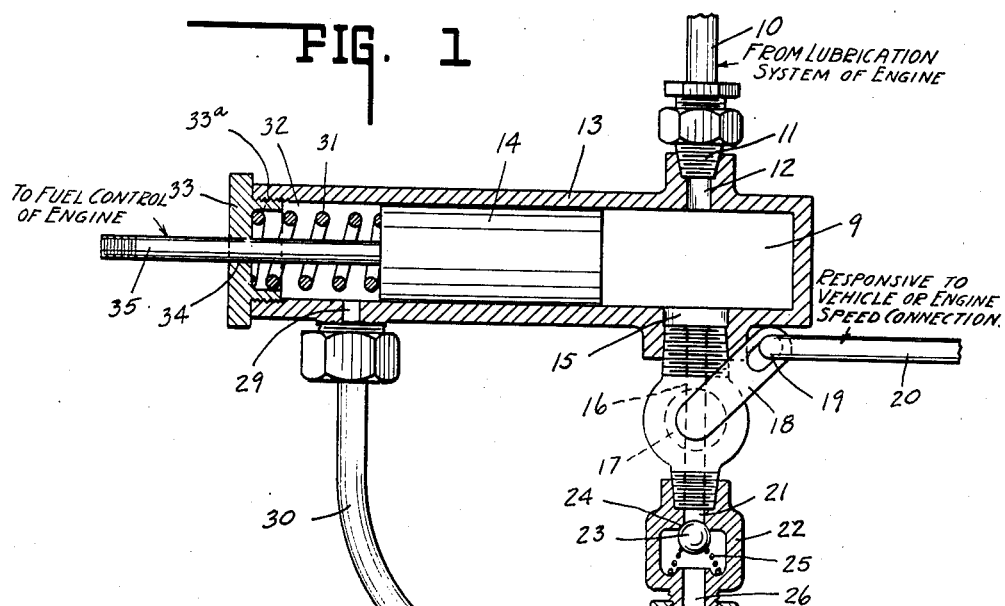
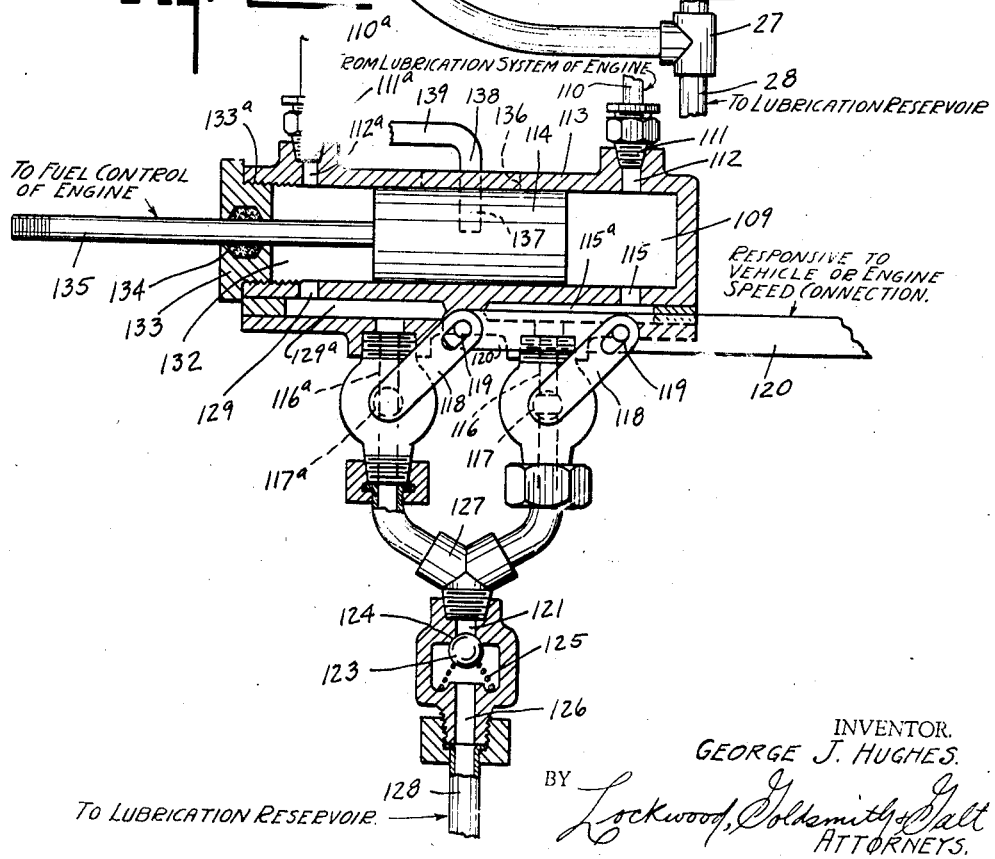
INVENTOR.
GEORGE J. HUGHES.
BY Lockwood, Goldsmith & Galt
ATTORNEYS.

July 13, 1943.　　　G. J. HUGHES　　　2,323,997
CONTROL SYSTEM
Filed April 19, 1941　　　2 Sheets-Sheet 2
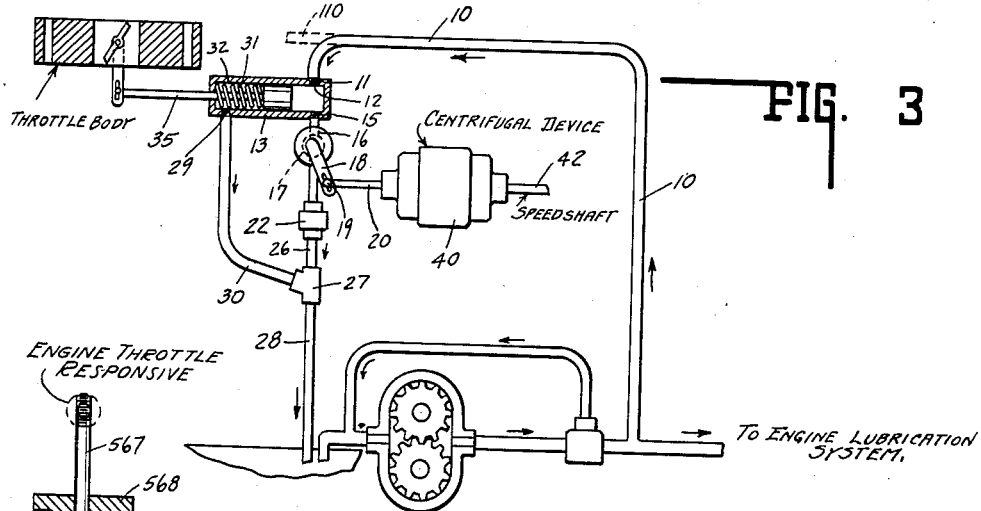
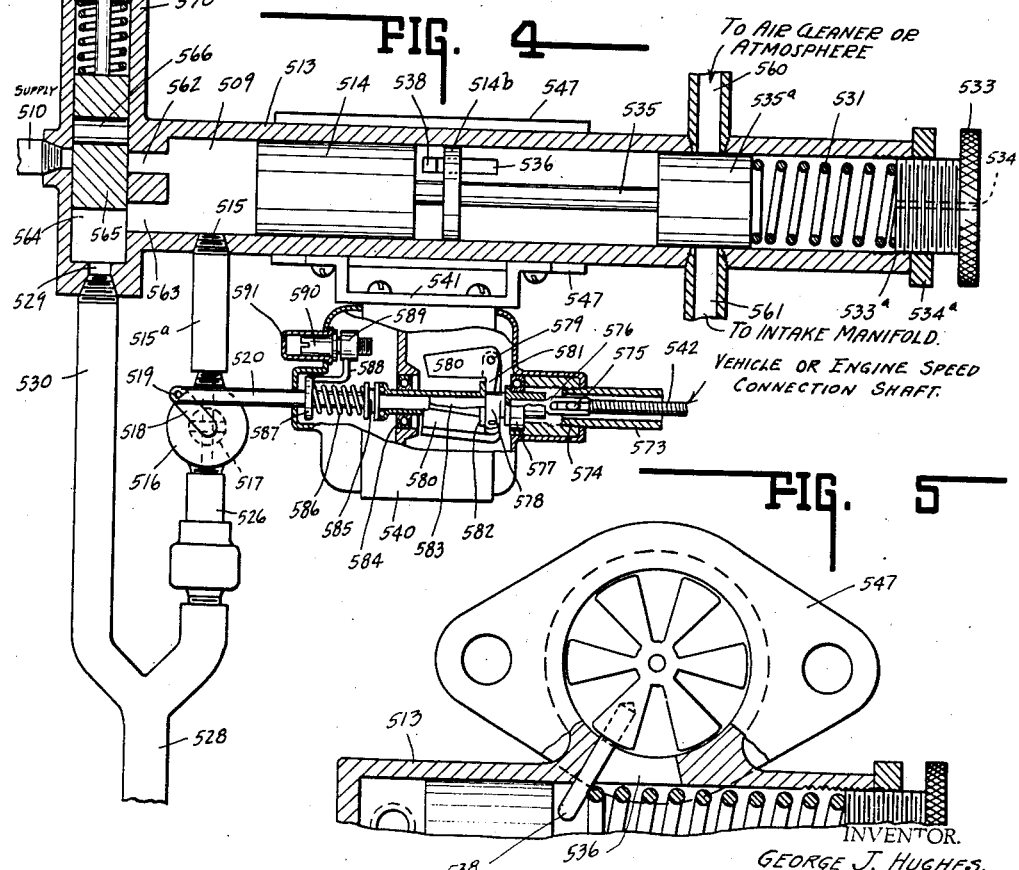
INVENTOR.
GEORGE J. HUGHES.
BY Lockwood, Goldsmith & Galt
ATTORNEYS.

Patented July 13, 1943

2,323,997

UNITED STATES PATENT OFFICE 2,323,997

CONTROL SYSTEM

George J. Hughes, Pendleton, Ind.

Application April 19, 1941, Serial No. 389,367

5 Claims. (Cl. 123—103)

This invention in its several forms is directed to a hydraulic operable device capable of utilization for control purposes and in combination with a speed responsive mechanism.

This speed responsive mechanism is herein disclosed as a centrifugal operable arrangement for mechanical regulation at a predetermined speed.

Such speed responsive devices are directly or indirectly driven from the propeller shaft of a transmission, or are directly or indirectly driven from some part of the prime mover, or may be directly or indirectly driven from some vehicle moving part as in the case of a self-propelled vehicle, such as a wheel. All of the aforesaid is conventional and well known and needs no illustration or further description. In the case of so-called stationary engines as used in industrial service, the speed responsive device is driven from any part of the prime mover, the movement of which is responsive to engine speed or is driven from a turbine which derives its power from the velocity of the oil generated by the oil pump of the oil pressure system of such prime mover.

This invention may be applied to engines of the type utilizing hydrocarbon liquid fuels and hydrocarbon gaseous fuels, and these include gas engines, gasoline and kerosene operable engines and Diesel and allied type engines.

The chief object of this invention is to provide a power piston responsive to pressure imposed thereon, which pressure preferably is a constant pressure permitting utilization of the lubricating system of the prime mover, whereby the engine control associated with said piston is such that a governor or like arrangement utilizing centrifugal or other force responsive to engine speed for parts movement results in a combination which provides the same governing characteristics as a true integral built hydraulic governor for such engine.

The invention preferably is interposed in or associated with the fuel control, broadly speaking, of the fuel supply system to the prime mover for controlling the supply of gaseous or liquid fuel and/or the air necessary for combustion of the mixture thereof but may also be employed in combination with a valve for shutting off the air supply of Diesel and like type engines in the event of failure of the oil pressure system or under any condition that would result in a prime mover speed, et cetera, beyond the predetermined speed for which the engine governor had been set.

The full nature of the invention will be understood from the accompanying drawings and the following description and claims:

In the drawings,

Fig. 1 is a central, sectional view, certain of the parts being shown in elevation, of one embodiment of the invention, the opposing force being of mechanical applied type.

Fig. 2 is a similar view of a second embodiment of the invention, the opposing force being of liquid pressure type and the construction in effect being of dual character and differentially operable.

Fig. 3 is a diagrammatic, skeletonized view of the embodiment shown in Fig. 1 with the remainder of the combination associated therewith.

Fig. 4 is a sectional view, parts being shown in elevation of another embodiment of the basic invention incorporating certain of the features illustrated in several of the preceding figures.

In Figs. 1 and 3 of the drawings, 10 indicates a constant pressure supply line. This line is under the normal oil pressure of the lubricating system of the prime mover with which the invention is associated as a control unit. This pressure line is of restricted capacity so that the take-off for unit operation will not cause damage to any engine part requiring adequate lubrication and for which the lubrication pressure system of said prime mover was devised. The end of this line, see Fig. 1, is detachably connected as at 11 to an intake port 12 of a cylinder 13 in which is mounted a close fitting, solid piston 14. The cylinder has the discharge 15 which communicates with the valve controlled passage 16 having a valve member 17 controlling the flow therethrough.

This valve member 17 is connected to an arm 18 in turn connected as at 19 to a rod member 20. This rod member 20 is movable longitudinally for arcuate movement of arm 18 to move valve 17 to control the discharge through the passage 16. The passage 16, controlled by valve 17, communicates with the passage 21 of a check valve structure 22 including a ball-check 23, a seat 24 and a spring 25.

The spring 25 is preloaded to an extent of about 2-pounds or so and normally constrains the ball 23 to its seat 24 unless pressure is applied to passage 21 in an amount in excess of such preloading whereupon the ball is moved from its seat and the pressure liquid flows from the passage 21 to the discharge passage 26. Herein the discharge passage 26 connects to a T-fitting 27 at one end, the opposite end connecting to a drain 28. The rear end of the cylinder 13 herein is shown provided with a port 29 and the drain conduit 30 connects said port 29 with the T-fitting 27 so that any leakage of pressure fluid from the chamber 9 in the cylinder 13 past the piston will waste to the drain line 28.

The pressure line 10 of Fig. 1 is a line, see Fig. 3, connected to the lubricating system adjacent the oil or lubricating pump 96 of the engine but on the remote side of the relief valve arrangement 92 commonly associated with such an oil pump. The line 28, being the drain or waste line from the secondary power unit, drains to the sump 95 from which the oil pump intake 94 derives the oil upon operation of the oil pump 96. Since oil pressure systems of engines are conventional and are well understood, no further disclosure by way of illustration, other than Fig. 3, or description is believed necessary, except to emphasize the fact that the liquid under pressure in line 10 is under near constant pressure under substantially all conditions of operation except in those instances wherein there may be slight variation in oil pressures, as in the initial starting of the engine in very cold weather or at slow idle engine speeds.

Within the cylinder 13, see Fig. 1, and at the rear end 32 thereof, there is provided an opposing spring 31. The end of said cylinder is closed by a hand structure 33 having threaded connection 33a with the cylinder 13 and being apertured at 34 to slidably support the control rod 35. This rod 35 is arranged at its free end and adapted to be connected to an engine control member and this control structure may be one of air regulation type or of fuel regulation type or of fuel mixture regulation type, as is commonly well understood in the art of engine control.

The rod 20 is a rod actuatable at a predetermined speed of either vehicle operation or engine operation, as desired. This rod may be directly operated from a centrifugal operable device as by means of a centrifugal weight arrangement 40 in Fig. 3—see Fig. 4 for greater detail—responsive to either engine speed or vehicle speed.

With the parts shown in Fig. 1 in the position illustrated in Fig. 1, it will be apparent that the liquid under pressure supplied by line 10 freely passes through to the drain 28 and effects no control. Any liquid that might accidentally leak past the piston 14 is collected at the port 29 and is discharged to drain line 28 by the free drain 30. The pressure applied by the fluid system is such that the ball 23 is held off its seat controlling this operation. When the engine or vehicle attains a predetermined speed for which the primary control mechanism associated with rod 20 is set to actuate, said rod tends to close the valve 17. Upon the valve being closed, the continued application of flow and pressure from line 10 is applied to the face of the piston 14 in the chamber 9 and the piston 14 is moved to the left in opposition to spring 32. This piston movement moves the secondary control 35 to the left and this, as has been explained, is connected, see Fig. 3, to an engine control 63 associated with the fuel supply arrangement 47 to reduce the fuel supply as at 43 and 44, either reducing the fuel per se, the air per se, or the fuel mixture.

Upon the closing of the valve 17, and ball check 23 immediately seats by reason of its spring 25 and thus this check valve arrangement maintains the liquid system ahead of the check valve and between the valve 17, full, or in other words, keeps the system loaded. Any leakage incident to the increase in pressure in chamber 9 which passes into chamber 32 is wasted by drain 30, as aforesaid.

The result of this type of operation is that when the predetermined engine or vehicle speed is reached, the rod 20 when actuated fully closes the valve 17, permitting oil pressure to be built up in chamber 9, thus applying pressure to the face of piston 14 which is moved to the left in opposition to spring 31. This piston movement moves rod 35 to reduce the flow of fuel or fuel mixture or air to the prime mover through the passage in part 47, Fig. 3.

The moment the speed of the prime mover slows below the predtermined speed, the rod 20 is returned by a return spring such as 58b in Fig. 4. The valve 17 is thus opened relieving the pressure in chamber 9, permitting the spring 31 to return the piston 14 which moves the rod 35 to permit the unrestrained flow of fuel or fuel mixture or air to the prime mover. As soon as the predetermined engine or vehicle speed is exceeded, the cycle is repeated. Thus, at full throttle, at the predetermined speed there would be a continuous repetition of the performance described.

However, the rod 20, when actuated by a centrifugal unit or governor acts as follows: When the predetermined engine or vehicle speed is reached, the rod 20, actuated by the speed responsive device 40, see Fig. 3, moves to close the valve 17, permitting oil pressure to be built up in chamber 9, thus applying pressure to the face of piston 14 which is then moved to the left in opposition to spring 31. The piston movement causes rod 35 to move and reduce the flow of fuel or fuel mixture or air to the prime mover. When this occurs, the speed of the vehicle or engine is reduced, and then the speed responsive device makes a partial return of the rod 20 which opens the valve 17 just sufficient to cause an equalization of pressures between spring 31 and the oil pressure in chamber 9. This holds the piston 14 in a fixed position so long as the speed of the prime mover remains unchanged. When, through load change on the prime mover the speed of same is increased, rod 20, impelled by the speed responsive device 40, see Fig. 3, makes a further partial closing of the valve 17 to increase pressure in chamber 9. This moves the piston 14 and rod 35 to act on the fuel supply member and maintain the predetermined speed of the prime mover.

When, through load change on the prime mover, the speed of same is decreased, the movements above described are reversed to again maintain the predetermined speed. When used in combination with a centrifugal unit or mechanical governor such as illustrated in Fig. 3, therefore, the invention becomes a regulating unit responsive to speed and load.

Reference now will be had to Fig. 2 and in this figure numerals of the 100 series, similar to those of the primary series applied and utilized in Figs. 1 and 3, refer in Fig. 2, to like or similar parts. This part of the invention differs from that shown in Fig. 1 in that the opposing spring 31 is omitted and in lieu thereof the power piston 114 is subject to pressures at opposite ends and such pressures are of differential character when the valves 117 and 117a are in any except an identically open position. The lines 110 and 110a in this instance are connected to line 10 in Fig. 3 by a branch connection, not shown. When the valves are in any other position, induced by the rod 120 impelled by the speed responsive device, the differential of pressures at each end of the piston 114 cause piston movement to regulate the fuel or fuel mixture or air supply. The piston 114, therefore, is differential pressure responsive, and is held in fixed position when the pressures are equal and constant at both ends which occurs when the valves 117 and 117a are in identically open positions.

In this form of the invention oil as stated flows by from line 10 in Fig. 3 lines 110 and 110a into the oil chambers 109 and 132. With the valve 117a open there is a free flow of oil through chamber 132 through the escape 127. But with the valve 117 closed, pressure is built up within chamber 109 to cause a movement of the piston 114 to the left in the direction of a throttle closing position. At the predetermined speed, the speed responsive device 40, see Fig. 3, the details of which are shown more fully in Fig. 4 at 540, moves rod 120 to partially open valve 117 and to partially close valve 117a causing an equalization of pressures in chambers 109 and 132 which equalization holds the piston 114 in a fixed position. Since the piston 114 is connected to the rod 135 or the optional rod 138, the throttle will be moved to the point corresponding to that for predetermined prime mover speed.

When, through load changes on the prime mover the speed of same is decreased, the rod 120, impelled by the speed responsive device, makes a partial opening of the valve 117 and a partial closing of the valve 117a to create a differential in pressures in chambers 109 and 132 to move the piston 114 to the right together with the rod 135, or the optional rod 138, for opening the throttle. When the predetermined speed again is reached, the speed responsive device moves rod 120 to a point where the position of valves 117 and 117a are again equal and open and again the piston 114 is held in a fixed position.

When, through load change on the prime mover, the speed is increased, the movements above described are reversed to again regain the predetermined speed and retain that speed through pressure constants in chambers 109 and 132 to hold the piston 114 in a fixed position. Therefore, while the piston 114 may be in any position of its travel, the control rod 120, under any condition of load, will always return to a position permitting the equalization of pressures on both ends of piston 114. Thus, it may be said that piston 114 is load responsive while the speed responsive device connected to rod 120 is speed responsive only.

In view of the fact that both ends of the cylinder have liquid communication with the drain 128, no supplementary free drain in this form of the invention is provided.

Whenever it is desired to provide either an additional control as for air and fuel per se, or a control as a substitute for the rod 135, the following may be utilized: The cylinder 113 is slotted as at 136. The length of this slot is such that it is never exposed by the piston 114 to either chamber at either end of the cylinder. Secured to the piston 114 as at 137 is a control member, the latter having the projecting portion 138 and the angular portion 139. This angular portion 139, it will be noted, has the same amount and type of movement as the piston rod 135 and may be used as such or therewith.

Reference now will be had to Figs. 4 and 5 wherein there is illustrated a modified form of the invention and herein numerals of the 500 series indicate parts like or similar to parts shown in the previous figures and designated by the primary and similar figures of the 100 series.

In this figure, 547 indicates the upper and lower flanges of a valve box structure having a valve therein and the same, if desired, may be of the type shown in Fig. 5. The cylinder 513 includes the slot 536 and the valve operating arm 538 projects from the valve box into the cylinder. The piston 514 is subject to pressure in the chamber 509. The piston 514 includes a rod 535 and the same is connected to a piston 535a. A coil spring 531 bears against one face of piston 535a and at its opposite end bears against a spring adjusting retainer structure, including the locknut 534a, the vented adjustable closure 533 having the vent 534 therein, the vented closure having threaded connection as at 533a with the spring container end of the elongated cylinder structure 513. A conduit 560 is oppositely aligned with the conduit 561 and communication between conduits 560 and 561 through cylinder 513 is controlled by piston 535a.

Piston 514 is reduced as at 514a or a collar 514b is secured to rod 535 so that the arm 538 is seated in the groove arrangement 514a so that as the piston moves to and fro, the valve, operable by arm 538, is moved in accordance. At no time does the piston 514 expose the slot 536 to the chamber 509.

The forward end of the chamber 509 is provided with two ports 562 and 563. The ports 562 and 563 communicate with a chamber 564. Therein is mounted a slide valve 565 having the passage 566 therethrough and said valve mounts a stem 567 slidably supported by the adjustable cap structure 568 having threaded engagement as at 569 with the upper end of the body portion 570 in which is formed the chamber 564. In this upper end is a compression spring 571, the force of which can be adjusted by 568. When the member 567 is not under manual control the member 565 is depressed, which forces the slide valve 565 downward to full retarded position so that port 566 then registers with the port 562 and line 510 and the port 563 are simultaneously blocked. As illustrated, the parts mentioned are in their respective positions corresponding to when the prime mover is being accelerated; hence, ports 566 and 562 do not communicate.

Member 565 is responsive to the spring thereabove when member 567 is manually elevated, the latter being connected to and operable by the means which actuates the conventional throttle (not shown) of the engine.

A pressure supply line is indicated by the numeral 510. This line is supplied with pressure fluid from line 10, see Fig. 3. The lower portion of chamber 564 is in free communication with the port 563, and hence, chamber 509, at all times that the port 562 does not communicate with the line 510. The chamber 564 has a drain port 529 and a line 530 connects same to the line 528 which is the return line to the lubricating system.

The chamber 509 has a port 515 and the same communicates with a valve 516 as at 515a and said valve discharges to the branch 526. It will be noted in this particular system, the check valve arrangement is not utilized. The valve 516 includes the valve member 517 having associated therewith the arm 518 connected as at 519 to the rod 520. This rod 520, in this instance, is shown by way of illustration only, as connected to a centrifugal operable mechanical structure, the same being indicated by the numeral 540 and mounted as at 541 to the cylinder 513, or if desired, to a portion of the valve box structure.

For convenience and by way of example only, it is pointed out that the illustration of the details of the centrifugal structure shown in Fig. 4 and indicated by 540, are merely a conventional illustration. For example, 542 indicates a speedometer drive cable or shaft enclosed within a flexible conduit 573 having a detachable connection as at 574 with the housing 540. The internal exposed end 575 of said shaft 542, has a slidable but rotative drive connection with the shaft 576. This shaft 576 is rotatably supported in the bearing arrangement 577. This shaft terminates in a collar portion 578 on which is pivoted as at 579 the weight structures having the weight portions 580 and an actuating arm portion 581.

These actuating arm portions engage the flange 582 of the sleeve 583, the latter being rotatably supported by the bearing structure 584. This sleeve 583 at its other end is secured to the shaft or rod 520 as at 585. A spring 586 which is concentric with the rod 520 and said member 587 is offset as at 588 and has an adjustable support 589 on the adjusting member 590, the latter being sealed and covered, if desired, as indicated at 591.

The sleeve 583 may or may not rotate. If it does rotate, the connection between said sleeve and rod 520 is of bearing type and not a direct connection. If the sleeve 583 does not rotate, then it may be directly connected to the rod 520.

When the shaft 542 rotates at the critical speed for which the centrifugal device is set to operate, said setting being determinable by the loading spring 586, the weight arms 580 move outwardly and thus the actuating arm portions move to the left and cause the sleeve 583 to move to the left and in like manner, the rod 520 similarly moves.

The cycle of operation of the structure shown in Figs. 4 and 5 is as follows:

The valve 565 is manually operable, the valve member 567 being connected by rod or other means to the accelerator control or dual controls. Any foot pressure on the accelerator lifts the sliding valve 565 against spring 571. Valve means 565 then breaks the otherwise continuing conduit made of the parts 510, 566 and 562, preventing further oil entry into pressure chamber 509. With the lifting of the sliding valve 565 the conduit 563 is uncovered, allowing the free escape of such oil as might be in chamber 509 and into oil drain line 530. When, however, the foot is removed from the accelerator, the spring 571 returns the valve 565 to its original position, re-establishing the continuing conduit, thereby permitting oil to flow under pressure from 510 through 566, to 562 and thence into pressure chamber 509.

The valve 517 is closed under all conditions where the vehicle is moving at a speed higher than the equivalent of a fast idling engine speed, induced by the positioning of centrifugal push rod 520.

Thus, when the vehicle is moving, and the foot is removed from the accelerator, the sliding valve 565 returns to permit oil to flow at pressure into chamber 509. With the vehicle moving at a speed greater than the equivalent of a fast idling engine speed, the valve 517 is closed. There, therefore, can be no oil escape through conduits 530 and 515a. With the sliding valve 565 in a returned position, there can be no oil escape through conduit 563. The incoming oil into chamber 509, then having no escape, builds up pressure against piston 514, causing said piston to overcome the tension of the spring 531. This movement of said piston moves the shutoff valve bellcrank 538 which, being tied to the shutoff valve in the throttle box, shuts off the fuel-air mixture to the manifold.

Conduit 560 is connected at its remote end to the air cleaner and conduit 561 is connected at its remote end to the intake manifold. Simultaneously with the closing of the shutoff valve in the throttle box, the secondary piston 535a, impelled by the piston stem 535 exposes the adjacent openings of said conduits 560 and 561, through the cylinder 513 remote from chamber 509. This permits air to be drawn into the engine manifold by manifold vacuum, said air combining with the unburned fuel in the manifold, the mixture being drawn into the engine cylinders and properly burned under compression, causing a complete degassing and scavenging of the engine, no further mixture being passed into the manifold until the vehicle movement becomes equal to the equivalent of a fast idling engine, or unless the accelerator is again pressed.

When used in combination with a centrifugal device, this centrifugal device being driven from the transmission by means of a flexible shaft and tube assembly and a suitable driving member, the centrifugal device to have weights opposed by a spring, said weights to be so matched with said spring as to go out on their pivots when the speed of the vehicle becomes the equivalent of a fast idling engine, thus extending the push rod 520 to close the valve 517, and to return to their closed position at any vehicular speed below the equivalent of a fast idling engine, thus retarding the push rod 520 to open the valve 517, the operation is as follows:

With the engine being started, with no pressure on the accelerator, and the vehicle, of course, not moving, oil immediately begins to flow from 510, through 566, through 562 into pressure chamber 509. With the vehicle not moving, however, the valve 517 is open and the oil flows freely through conduit 526 to the crankcase, no pressure being built up in 509 and, therefore, no movement of the piston 514.

As the vehicle is accelerated, the valve stem 567 is raised, shutting off the oil supply port 510 so long as the foot is on the accelerator. As vehicular speed is increased, the weights in the centrifugal device go out on their pivots, the pushrod 520 is advanced, and the valve 517 is closed, and prepared for the deceleration process.

Conduit 563 is provided to offer release from oil pressure against piston 514 in chamber 509 under momentary deceleration periods such as are encountered in normal traffic, and where the engine must be reaccelerated before the vehicular speed is reduced to the equivalent of a fast idling engine. The lifting of the valve 565 on reacceleration closes port 510 and opens port 563 to unload the oil which has accumulated in chamber 509.

On deceleration the valve 565 is open to conduit 510 permitting oil to flow into chamber 509. With valve 517 closed and with conduit 563 closed, the oil, having no escape, builds up pressure against piston 514 to close the throttle valve and introduce air into the manifold. When the vehicle has slowed sufficiently to cause the weights in the centrifugal device to return to their closed position, the push-rod 520 opens the valve 517 to release the pressure in 509, permitting the loaded spring 531 to return the piston 514, opening the throttle valve and closing the air conduits 560 and 561 to permit the continued operation of the engine at idle speed.

These unburned gases left in the manifold "cook" and "fry" causing a coking action in the manifold which eventually results in irregular engine performance.

This embodiment of the invention—Fig. 4—not only saves fuel because it shuts off the fuel supply, on deceleration but scavenges the manifold and prevents fuel coking and frying during the cutoff period.

The ultimate, specific purposes of the exemplifications vary as herein previously described and the most complicated embodiments are illustrated in Figs. 2 and 4. The simplest embodiment is illustrated in Fig. 1.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A throttle control including a cylinder, a source of pressure fluid connected thereto, a speed control device effectively operable upon attainment of a critical speed, a discharge from the cylinder, a valve controlling said discharge and directly responsive to the speed control device when above critical speed for operation in accordance with and by the same, a piston means in said cylinder, and a throttle controlling member connected for movement in accordance with and by piston means in response to the difference between the pressure fluid supplied to the cylinder and discharged therefrom through the speed operable device controlled valve controlled discharge, the piston means being normally constrained for movement in a direction opposed to the pressure fluid responsive direction, a light pressure check valve is included in the discharge downstream of the speed responsive valve therein.

2. A throttle control including a cylinder, a cylinder, a source of pressure fluid connected thereto, a speed control device effectively operable upon attainment of a critical speed, a discharge from the cylinder, a valve controlling said discharge and directly responsive to the speed control device when above critical speed for operation in accordance with and by the same, a piston means in said cylinder, and a throttle controlling member connected for movement in accordance with and by piston means in response to the difference between the pressure fluid supplied to the cylinder and discharged therefrom through the speed operable device controlled valve controlled discharge, the piston means being normally constrained for movement in a direction opposed to the pressure fluid responsive direction, a drain is connected at one end to the cylinder opposite the source of fluid pressure connection thereto and the other end is connected to the discharge downstream of the speed responsive valve therein.

3. A throttle control including a cylinder, a source of pressure fluid connected thereto, a speed control device effectively operable upon attainment of a critical speed, a discharge from the cylinder, a valve controlling said discharge and directly responsive to the speed control device when above critical speed for operation in accordance with and by the same, a piston means in said cylinder, and a throttle controlling member connected for movement in accordance with and by piston means in response to the difference between the pressure fluid supplied to the cylinder and discharged therefrom through the speed operable device controlled valve controlled discharge, the piston means being normally constrained for movement in a direction opposed to the pressure fluid responsive direction, a light pressure check valve is included in the discharge downstream of the speed responsive valve therein, and a drain is connected at one end to the cylinder opposite the source of fluid pressure connection thereto and the other end is connected to the discharge downstream of the speed responsive valve and check valve therein.

4. A throttle control including a cylinder, a source of pressure fluid connected thereto at opposite ends, a speed control device effectively operable upon attainment of critical speed, a discharge from each end of the cylinder, a valve in each discharge, means connecting the valves together so that one is closed when the other is open and vice versa and connected to and responsive to and operable in accordance with and by the speed control device operation above critical speed, piston means in the cylinder and exposed at opposite ends to the fluid therein, and a throttle member operatively associated with the piston means for operation thereby and in accordance with piston means differential pressure operation.

5. A throttle control as defined by claim 4 wherein light pressure check valve means is included in the discharges downstream of the speed responsive valves therein for maintaining a fully loaded fluid system at all times.

GEORGE J. HUGHES.